United States Patent [19]
Muroi et al.

[11] Patent Number: 6,114,000
[45] Date of Patent: Sep. 5, 2000

[54] MATERIAL FOR FRTP MOLDED OBJECTS AND FRTP TUBULAR MOLDED OBJECT

[75] Inventors: Kunimasa Muroi; Toshiharu Fukushima; Kunio Hiyama, all of Hamamatsu, Japan

[73] Assignee: Yamaha Corporation, Japan

[21] Appl. No.: 09/109,461

[22] Filed: Jul. 2, 1998

Related U.S. Application Data

[63] Continuation-in-part of application No. 08/634,178, Apr. 18, 1996, abandoned.

[30] Foreign Application Priority Data

Apr. 25, 1995 [JP] Japan ..................... 7-101485

[51] Int. Cl.⁷ .................................................. B32B 27/12
[52] U.S. Cl. ..................... 428/57; 428/172; 428/192; 428/194; 428/297.7; 428/298.1; 428/300.7
[58] Field of Search .................... 428/192, 194, 428/297.7, 298.1, 300.7, 57, 172

[56] References Cited

U.S. PATENT DOCUMENTS

| 4,997,693 | 3/1991 | Sonoh et al. .............................. 428/46 |
| 5,496,602 | 3/1996 | Wai ........................................... 428/40 |

FOREIGN PATENT DOCUMENTS 47-37865  12/1972  Japan .
6-322160  11/1994  Japan .

*Primary Examiner*—Elizabeth M. Cole
*Attorney, Agent, or Firm*—Ostrolenk, Faber, Gerb & Soffen, LLP

[57] ABSTRACT

A ribbon-shaped material for FRTP molded objects 1 having a laminate 4 in which a ribbon-shaped reinforcing fiber tow 2 is placed between thermoplastic resin films for supplying matrix resin which are wider than the ribbon-shaped reinforcing fiber tow 2, and in which the thermoplastic resin films 3,3 are fused in side portions 5,5 of the laminate 4, which are along the longitudinal direction of the laminate 4; and a wide material for FRTP molded objects 30,40 obtained by arranging a plurality of the ribbon-shaped materials for FRTP molded objects 1 whereby adjacent ribbon-shaped materials for FRTP molded objects 1,1 overlap each other in a manner such that the side portion 5 of one of the adjacent ribbon-shaped materials for FRTP molded objects 1 is placed on the side portion 5 or the middle portion 6 of the other along the longitudinal direction, and fusing together each overlapping portion 31,41 of the ribbon-shaped materials for FRTP molded objects 1, whereby the reinforcing fiber tows 2 are arranged in parallel; are advantageous in providing excellent impregnation of the reinforcing fiber with the thermoplastic resin, giving a great freedom of design, providing easy handling, creating no fuzz of the reinforcing fiber, and being flexible. Using such a material for FRTP molded objects 1,30,40, an inexpensive FRTP tubular molded object having a superior strength can be produced.

16 Claims, 7 Drawing Sheets

MATERIAL FOR FRTP MOLDED OBJECTS AND FRTP TUBULAR MOLDED OBJECT

RELATED APPLICATIONS

This application is a Continuation In-Part of Ser. No. 08/634,178, filed Apr. 18, 1996, now abandoned the entire disclosure of which is incorporated by reference herein.

BACKGROUND OF THE INVENTION

1. Field of the Invention

The present invention refers to a tubular molded object made of a fiber reinforced thermoplastic resin plastic (FRTP), and relates to a material for FRTP molded objects to be used for producing FRTP tubular molded object as well as to the FRTP tubular molded object produced using the material for FRTP molded objects.

2. Description of Related Art

Materials for FRTP molded objects, which can be used for producing FRTP tubular molded objects such as racket frames, are conventionally known, such as a cylindrical sleeve, which is formed by preparing a matrix fiber by spinning a thermoplastic resin for a matrix, such as polyamide and polycarbonate, into a fiber; mixspinning a matrix fiber tow consisting of the matrix fiber and a reinforcing fiber tow consisting of glass fiber, carbon fiber, or the like, into a yarn having a round cross section; and braiding this yarn into a sleeve;

a completely-impregnated tape which is obtained by impregnating a reinforcing fiber with a melted thermoplastic resin;

a partially-impregnated tape which is obtained by impregnating a reinforcing fiber with a thermoplastic resin only at the periphery thereof; and a uni-directional cloth which is obtained by mix-weaving a reinforcing fiber and a resin fiber.

However, in the case when an FRTP tubular molded object is produced using the conventional sleeve, since a carbon fiber tow having a large tex number (for example, a carbon fiber tow of 12 K), which is inexpensive, is used as the reinforcing fiber tow in the yarn, the reinforcing fiber tow is thick, having a large diameter. Therefore, large spaces are formed around the intersections of the reinforcing fibers, which may remain as voids or resin rich parts in the FRTP tubular molded object. Thus, the FRTP tubular molded object has a reduced strength. Furthermore, since the intersection of the reinforcing fibers becomes thick, it is difficult to uniformly impregnate the reinforcing fibers with a resin. Therefore, the thus-obtained FRTP tubular molded object has a disadvantage in appearance, since it is susceptible to wrinkling and resin-richness.

In the case when the conventional yarn is used, since the yarn is thick, having a large diameter, a sleeve obtained therefrom becomes thick, and the weight per unit length becomes large. Therefore, when an FRTP tubular molded object which is desired to have a light weight and a high strength, such as a racket frame, only about three layers of the sleeves can be layered; thus, freedom of design is limited and strength is not satisfactory.

Furthermore, when a sleeve is made by braiding a conventional yarn, the reinforcing fiber becomes fuzzy and frayed. In such a case, there are problems in that dust is produced from the reinforcing fiber and in that the strength of the obtained FRTP tubular molded object is reduced.

The above completely-impregnated tape is not flexible, since it is an FRTP itself. Therefore, it is difficult to make a sleeve by braiding the completely-impregnated tape. Moreover, it is difficult to wind the completely-impregnated tape around a core material in the production of an FRTP tubular molded object according to a filament winding method or the like.

The above partially-impregnated tape may be comparatively flexible; however, it is expensive, and thus an FRTP tubular molded object obtained therefrom is also expensive. Furthermore, some partially-impregnated tapes are not flexible, and it is difficult to produce a sleeve with such a rigid tape and to wind it around a core material, in a similar manner to the above completely-impregnated tape.

The above unidirectional cloth is expensive. Using the uni-directional cloth, it is difficult to impregnate the reinforcing fiber with the resin fiber. When mix-weaving the reinforcing fiber and the resin fiber, the reinforcing fiber becomes fuzzy.

SUMMARY OF THE INVENTION

The object of the present invention is to provide an FRTP tubular molded object which is superior in strength and which is inexpensive, as well as to provide a material for FRTP molded objects to be useful in producing such an FRTP tubular molded object, providing excellent impregnation of a reinforcing fiber with a thermoplastic resin, giving a greater freedom of design, providing easy handling, creating no fuzz of the reinforcing fiber, and being flexible.

According to a first aspect of the present invention, a material for FRTP molded objects is provided which comprises a laminate in which a collection of reinforcing fibers is placed between thermoplastic resin films for supplying matrix resin; the laminate having side portions, in each of which the thermoplastic resin films are fused, and a middle portion, which contains the collection of reinforcing fibers and parts of the thermoplastic resin films holding the collection of reinforcing fibers therebetween.

According to a second aspect of the present invention, a ribbon-shaped material for FRTP molded objects is provided which comprises a laminate in which a collection of reinforcing fibers in a ribbon shape, such as a ribbon-shaped reinforcing fiber tow and a ribbon-shaped yarn, is placed between thermoplastic resin films for supplying matrix resin which are wider than the collection of reinforcing fibers; the laminate having side portions, in each of which sides of the thermoplastic resin films along a longitudinal direction of the laminate are fused, and a middle portion, which contains the collection of reinforcing fibers and parts of the thermoplastic resin films holding the collection of reinforcing fibers therebetween.

According to a third aspect of the present invention, a material for FRTP molded objects is provided in which the laminate according to the first or second aspect of the present invention is an alternating laminate of collections of reinforcing fibers and thermoplastic resin films for supplying matrix resin.

According to a fourth aspect of the present invention, a wide material for FRTP molded objects is provided which comprises a plurality of materials for FRTP molded objects selected from those of the first to third aspects, in which the wide material for FRTP molded objects has an overlapping portion in which a pair of adjacent materials for FRTP molded objects overlap each other in a manner such that the side portion of one of the adjacent materials is placed on the side portion of the other, and are fused, whereby the collections of reinforcing fibers are arranged in parallel.

According to a fifth aspect of the present invention, a wide material for FRTP molded objects is provided which comprises a plurality of materials for FRTP molded objects selected from those of the first to third aspects, in which the wide material for FRTP molded objects has an overlapping portion in which a pair of adjacent materials for FRTP molded objects overlap each other in a manner such that the side portion of one of the adjacent materials is placed on the middle portion of the other, and are fused, whereby the collections of reinforcing fibers are arranged in parallel.

According to a sixth aspect of the present invention, an FRTP tubular molded object is provided using the material for FRTP molded objects of one of the first to fifth aspects of the present invention.

Since the material for FRTP molded objects according to the present invention comprises a laminate in which a collection of reinforcing fibers is placed between thermoplastic resin films for supplying matrix resin and in which the thermoplastic resin films are fused, delamination of the thermoplastic resin film hardly occurs, and the reinforcing fiber does not fall apart; thus, the material for FRTP molded objects has advantages, when a sleeve or the like is formed therefrom, in providing easy handling, creating no fuzz of reinforcing fiber, and being flexible.

Furthermore, the ribbon-shaped material for FRTP molded objects and the wide material for FRTP molded objects, having the above-described constitutions, have advantages in providing excellent impregnation of the reinforcing fiber with the thermoplastic resin, giving a great freedom of design, providing easy handling, creating no fuzz of the reinforcing fiber, and being flexible.

The wide material for FRTP molded objects according to the fifth aspect of the present invention has an additional advantage in that the reinforcing fibers can be more densely and more uniformly contained in an FRTP molded object obtained therefrom.

Moreover, the FRTP tubular molded object according to the sixth aspect of the present invention, which is obtained by using the above material for FRTP molded objects, has advantages in its excellent strength and inexpensiveness.

BRIEF DESCRIPTION OF THE DRAWINGS

FIG. 4 is a diagram for explaining an example of production of an FRTP tubular molded object of the first embodiment, in which

DESCRIPTION OF THE PREFERRED EMBODIMENTS

In the following, examples of the present invention are explained with a view to a better understanding of the present invention. The examples merely serves to illustrate embodiments of the present invention; thus, the present invention is not limited to these examples. The present invention is arbitrarily modifiable within its scope.

A first embodiment of an FRTP tubular molded object according to the present invention will be explained hereinbelow.

Figure 1:
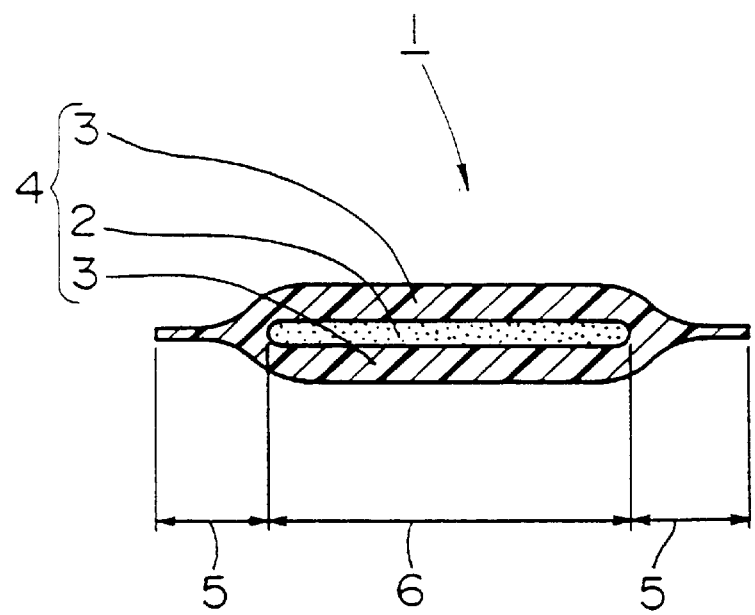
FIG. 1 is a cross-sectional view showing an example of a ribbon-shaped material for FRTP molded objects to be used for producing an FRTP tubular molded object of a first embodiment of the present invention.

FIG. 1 shows an example of a ribbon-shaped material for FRTP molded objects to be used in the first embodiment. The ribbon-shaped material for FRTP molded objects 1 has a thin and flat structure of a laminate 4 in which a ribbon-shaped reinforcing fiber tow 2 is placed between thermoplastic resin films for supplying matrix resin, the thermoplastic resin films being wider than the ribbon-shaped reinforcing fiber tow 2, and in which the thermoplastic resin films 3,3 are fused in side portions 5,5 of the laminate 4, which are along the longitudinal direction of the laminate 4.

The ribbon-shaped reinforcing fiber tow 2 is thin and flat which can be obtained by opening a reinforcing fiber tow having a round cross-section such as a carbon fiber roving having a tex number of 800 (a filament number of 12K). The ribbon-shaped reinforcing fiber tow 2 has a thickness preferably not larger than 1 mm, and more preferably not larger than 0.5 mm. The proportion of the width of the ribbon-shaped reinforcing fiber tow 2 to the thickness thereof is preferably not smaller than 4, and more preferably not smaller than 10. The ribbon-shaped reinforcing fiber tow 2 is made of reinforcing fibers which may be aramid fibers, glass fibers, carbon fibers, or the like.

Each thermoplastic resin film 3 has a thickness preferably not larger than 100 $\mu$m, and more preferably, not larger than 50 $\mu$m. It has a width which is sufficient for keeping the ribbon-shaped reinforcing fiber tow 2 from falling out from the side portions 5,5 of the laminate 4 when the ribbon-shaped reinforcing fiber tow 2 is placed between the thermoplastic resin films 3,3, and which is sufficient for connecting the thermoplastic resin films in the side portions 5,5 of the laminate 4.

The thermoplastic resin film 3 is made of a thermoplastic resin such as polyamide, polycarbonate, polyphenyleneoxide, and polyetherimide.

The thermoplastic resin film 3 may preferably have numerous pores (not shown in the figure). The sizes of the pores may be in the range of approximately 100 $\mu$m to 1 mm in diameter. The degree of distribution of the pores may be approximately 1 to 50 pores/cm2.

In the case when a sleeve prepared by braiding a ribbon-shaped material for FRTP molded objects, which is obtained from thermoplastic resin films 3,3 having such pores, is used for forming an FRTP tubular molded object by vacuum drawing, air remaining in the ribbon-shaped reinforcing fiber tow 2 can be released to the outside of the ribbon-shaped material for FRTP molded objects through the pores; therefore, there will be no voids remaining in the thus-obtained FRTP tubular molded object.

The ribbon-shaped material for FRTP molded objects 1 has a thickness preferably not larger than 1 mm, and more preferably not larger than 0.5 mm. The proportion of the width of the ribbon-shaped material for FRTP molded objects 1 to the thickness thereof is preferably not smaller than 4, and more preferably not smaller than 10.

Among constituents for the ribbon-shaped material for FRTP molded objects 1, the weight ratio of the ribbon-shaped reinforcing fiber tow 2 to the thermoplastic resin film 3 is not specifically limited; however, it is determined according to a required volume content (Vf) of the reinforcing fiber in the FRTP tubular molded object 1. In addition, the tex number of the ribbon-shaped reinforcing fiber tow 3 is also determined suitably according to the Vf value.

Figure 2:
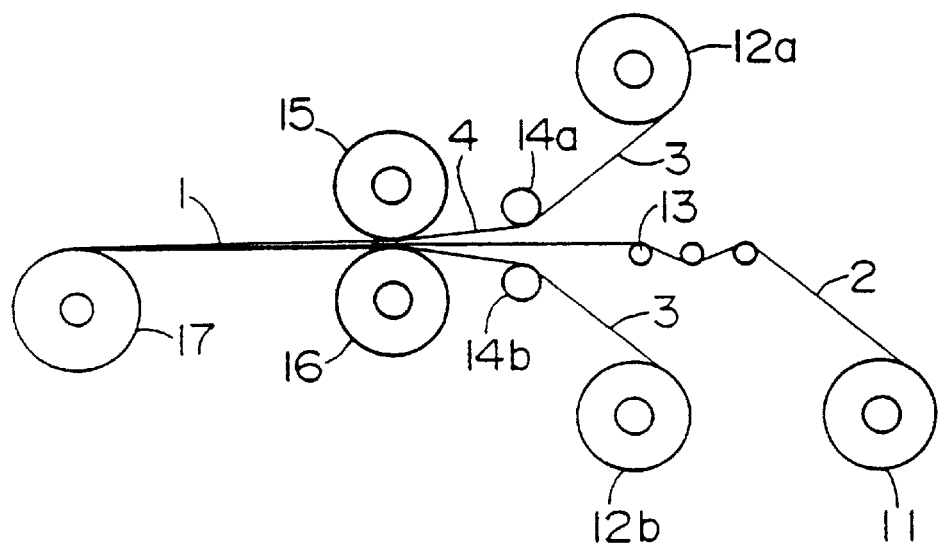
FIG. 2 is a schematic structural view showing an example of a production apparatus to be preferably used for producing the ribbon-shaped material for FRTP molded objects in FIG. 1.

FIG. 2 shows an example of a production apparatus to be preferably used for producing the ribbon-shaped material for FRTP molded objects 1 in FIG. 1.

In FIG. 2, reference numeral 11 indicates a primary feeding roller around which a ribbon-shaped reinforcing fiber tow 2 is wound; reference numeral 12a and 12b indicate a pair of secondary feeding roller around which thermoplastic resin films 3,3 are wound, respectively; reference numeral 13 indicates a primary guide roller; reference numerals 14a and 14b indicate a pair of-secondary guide rollers; reference numeral 15 indicates a hot roll; reference numeral 16 indicates a silicone rubber roll; and reference numeral 17 indicates a reeling roller.

Using the production apparatus shown in FIG. 2, a ribbon-shaped material for FRTP molded objects 1 as shown in FIG. 1 is produced according to the following steps.

First, a ribbon-shaped reinforcing fiber tow 2 is fed from the primary feeding roller 11 to the primary guide roller 13, and then to the space between the secondary guide rollers 14a,14b. At the same time, the thermoplastic resin films 3,3 are fed from the secondary feeding rollers 12a, 12b to the space between the secondary guide rollers 14a, 14b, whereby the ribbon-shaped reinforcing fiber tow 2 is placed perpendicularly between these thermoplastic resin films 3,3 so as to form a laminate 4.

Then, the laminate 4 is fed to the space between the hot roll 15 and the silicone rubber roll 16 to be heated under pressure. Accordingly, since both side portions 5,5 of the laminate 4 do not contain fibers which provide thermal insulation, the thermoplastic resin films 3,3 are easily fused at these portions, and a ribbon-shaped material for FRTP molded objects 1 is obtained in which the ribbon-shaped reinforcing fiber tow 2 in the middle portion 6 is not impregnated or very slightly impregnated with thermoplastic resin which constitutes the thermoplastic resin films 3,3.

In order to make the ribbon-shaped material for FRTP molded objects 1 sufficiently flexible, it is preferable that not more than 50% of the reinforcing fibers be impregnated with the thermoplastic resin. Furthermore, it is preferable that at least reinforcing fibers near the surface having contact with the thermoplastic resin films 3,3 be adhered thereto by fusion, since the reinforcing fibers can be readily aligned. The resin film has a relatively high resin content i.e., a volumetric fiber content (Vf) of 30 to 60%, preferably 40 to 60% and more preferably 50 to 60%.

The range of fiber content (Vf) necessary is determined in order to achieve the following objects.

1. In Order to Surely Achieve Strength Sufficient for a Fiber-reinforced Material When a conventional fiber-reinforced material is molded, a volumetric fiber content (Vf) over 60% causes reduction in short beam shear strength. Therefore, it is normally preferably that the volumetric fiber content be 60% or lower except when rigidity or lightness of material is particularly sought. (A volumetric fiber content (Vf) of 60% is equivalent to a resin content of 30% by weight when the specific gravity of Eiber is 1.7 (carbon fiber), and the specific gravity of resin 1.1.)

A major reason for this is because a small amount of resin (a large amount of fiber) results in incomplete impregnation of the resin in spaces between fibers, and voids are formed, or transmission of stress is blocked.

The molded condition can be examined by observing impregnation of resin in a cross section of the molded article.

Accordingly, it is necessary to maintain a volumetric fiber content (Vf) of 60% or lower (a resin content of 30% by weight or higher) in order to surely achieve strength required for a fiber-reinforced composite material.

In contrast, when the amount of resin is too large (when the amount of fiber is too small), there are disadvantages in that the overall weight increases, and the rigidity degrades.

Accordingly, the upper limit of the amount of resin (the lower limit of the amount of fiber) is determined in view of the requirements of weight, rigidity, and strength of a composite material. A volumetric fiber content (Vf) of 40% or higher is normally preferable, and a volumetric fiber content (Vf) of 50% or higher is more preferable. (A volumetric fiber content (Vf) of 40% is equivalent to a resin content of 49% by weight when the specific gravity of fibers is 1.7 (carbon fiber), and the specific gravity of resin 1.1.)

In general, a volumetric fiber content (Vf) should not exceed 60% in view of the requirement in strength of a fiber-reinforced composite material, and a volumetric fiber content (Vf) should not preferably be less than 40% even when a large amount of resin is used. In addition, for a composite material, the lightness and strength of which are to be utilized, and, in particular, for a prepreg in which fibers are oriented in a single direction, it is desirable that a volumetric fiber content (Vf) should not be less than 50%.

2. In Order to Produce a Tape-shaped Thermoplastic Prepreg

In the present invention, fibers are completely enclosed by tape-shaped resin films, which are fused together at both sides so as to prevent the fibers from projecting and to preserve the overall shape. Accordingly, if a resin film having an extremely thin film is used, the overall shape may not be maintained since non-resin-covered areas may partially form on the surface, or since the fibers are separated because the fused side portions are not properly formed and the fibers cannot be protected by the films as a sheath.

In this respect again, a range of the resin content is considered in view of the thickness of the resin film.

EXAMPLES

With regard to the following material Nos. 1–6, the possibility of producing a prepreg, the condition of the prepreg, readiness for handling, the resin impregnation condition after molding, and the weight per meter were evaluated.

Material No. 1: made of a carbon fiber having a tex number of 700 and a nylon film having a width of 13 mm and a thickness of 10 μm (Vf 65%).

Material No. 2: made of carbon fiber having a tex number of 700 and a nylon film having a width of 13 mm and a thickness of 12 μm (Vf 60%).

Material No. 3: made of carbon fiber having a tex number of 700 and a nylon film having a width of 13 mm and a thickness of 15 μm (Vf 55%).

Material No. 4: made of a carbon fiber having a tex number of 700 and a nylon film having a width of 13 mm and a thickness of 18 μm (Vf 50%).

Material No. 5: made of a carbon fiber having a tex number of 700 and a nylon film having a width of 13 mm and a thickness of 22 μm (Vf 45%).

Material No. 6: made of a carbon fiber having a tex number of 700 and a nylon film having a width of 13 mm and a thickness of 27 μm (Vf 40%).

The results of the evaluations are shown in the following table:

| No. | Production of Prepreg | Condition of Prepreg | Readiness of Handling | Resin Impregnation Condition After Molding | Weight per Meter |
|---|---|---|---|---|---|
| 1 | The films were so thin that they broke during production of prepreg and could not complete cover the surface | Although the prepreg was flexible, protective function thereof was inferior since fibers inside were partially exposed | There were some cases in which fibers inside projected when the prepreg was handled in filament winding | Many portions which were not impregnated were observed | 10.09 g |
| 2 | Production was barely possible | No problem | No problem | Some portions which were not impregnated were observed | 1.15 g |
| 3 | No problem | No problem | No problem | Almost no portions which were not impregnated were observed | 1.24 g |
| 4 | No problem | No problem | No problem | Almost no portions which were not impregnated were observed | 1.32 g |
| 5 | No problem | The prepreg was slightly too rigid since the fibers are impregnated with too much resin | Since the no prepreg was slightly too rigid, winding the prepreg was difficult | There was portion which was not impregnated; however, resin-rich portions were observed | 1.44 g |
| 6 | Irregularities were formed during reeling the produce prepreg | The prepreg was very rigid and it was difficult to handle the prepreg since the fibers are impregnated with a considerable amount of resin | Since the prepreg was very rigid, winding the prepreg was difficult | Quite a few resin-rich portions were observed | 1.58 g |

Even in the case of a conventional FRP in which a thermosetting resin, which has a good resin impregnation property, is used, a volumetric fiber content (Vf) exceeding 60% is avoided except for special cases since strength degrades as such a fiber content is liable to cause problems in the adhesion between the fibers. Use of a thermoplastic resin at a volumetric fiber content (Vf) exceeding 60% would also cause problems since it is difficult to impregnate fibers with a thermoplastic resin which has a high viscosity when melted. Furthermore, prepreg containing a thermoplastic resin at a volumetric fiber content (Vf) exceeding 60% cannot be used since a resin layer on the surface would be thin and readily broken so that fibers inside cannot be protected by the resin layer, and fibers may project or become fuzzy in subsequent steps.

Although there is no problem in production of prepreg and impregnation of resin in the case of materials having a volumetric fiber content (Vf) of less than 50%, the materials are liable to cause resin-rich portions after molding since those materials rather contain excessive amounts of resin. In addition, since the resin soaks deeply into the fibers during production, rigidity of the prepreg increases, and it becomes difficult to handle such a prepreg.

In the case of a composite material which is required to be light and highly rigid such as sporting goods, the prepreg used should have a volumetric fiber content of 40% or higher and preferably 50% or higher so as to avoid degradation of rigidity and increase in weight.

This results in a resin film layer of the prepreg which, because it contains a large amount of resin, is relatively thick. Accordingly, the surface portions of the prepreg comprising only the resin remains. This surface portion serves as a sheath protecting the fibers inside. Additionally, since the fibers can slide along each other in the center portion the prepreg is flexible By using a property of a thermoplastic resin film which varies the softening level of the film according to temperature in the heating step, it becomes possible to maintain the flexibility of the prepreg even though the resin film has a relatively large resin content. More specifically, the temperature and the pressure are controlled so as to impregnate only the surfaces of the fiber layer. For example, the temperature may be set at 240–260° C. and the pressure may be set at 3–7 kg/cm$^2$.

Finally, the ribbon-shaped material for FRTP molded objects 1 is delivered from the space between the hot roll 15 and the silicone rubber roll 16 to a cold roller (not shown in the figure), on which the ribbon-shaped material for FRTP molded objects 1 is cooled to room temperature, and thereafter reeled on the reeling roller 17.

Since in the ribbon-shaped material for FRTP molded objects 1, a thin ribbon-shaped reinforcing fiber tow 2 is placed between wider thermoplastic resin films 3,3 for supplying matrix resin, impregnation of the reinforcing fiber with the thermoplastic resin will be desirable when the ribbon-shaped material for FRTP molded objects 1 is heat-molded into an FRTP tubular molded object; accordingly, since wrinkling and resin-richness hardly occur, an FRTP tubular molded object having an excellent appearance can be obtained. In addition, a sleeve, a cloth, or a prepreg for filament winding can be easily produced from the ribbon-shaped material for FRTP molded objects 1, since it is thin and flat; it is flexible as the ribbon-shaped reinforcing fiber tow 2, which is placed in the middle portion 6 of the laminate 4, is not impregnated or very slightly impregnated with the thermoplastic resin which constitutes the thermoplastic resin films 3,3; the thermoplastic resin films 3,3 are hardly delaminated as they are fused in both side portions 5,5 of the laminate 4; and the reinforcing fibers do not fall apart as the ribbon-shaped reinforcing fiber tow 2 is surrounded by the thermoplastic resin films 3,3.

Moreover, in producing a sleeve by braiding the ribbon-shaped material for FRTP molded objects 1, the reinforcing fibers do not create fuzz and do not fray; accordingly, creation of reinforcing fiber dust as well as reduction in the strength of the FRTP tubular molded material obtained can be avoided.

Furthermore, since the ribbon-shaped reinforcing fiber tow 2 can be obtained from an inexpensive reinforcing fiber tow having a large tex number (such as a carbon fiber tow of 12 K), the ribbon-shaped material for FRTP molded objects 1 is inexpensive.

By producing a tape-shaped prepreg using thermoplastic resin films, a prepreg is obtained without having a sticky surface as is the case with a prepreg produced by a conventional method using a thermosetting resin.

Accordingly, the prepreg of the present invention does not require a release paper.

Furthermore, when the tape is used in a machine such as a filament winding machine, the tape neither adheres to the machine nor stains the machine with the resin. Still further, the thermoplastic resin is cured at room temperature and the upper and lower resins are completely fused together at the side portions. Therefore, the resultant tape has sufficient strength so that it will not break during subsequent processing, such as winding in a filament winding machine.

Figure 3:
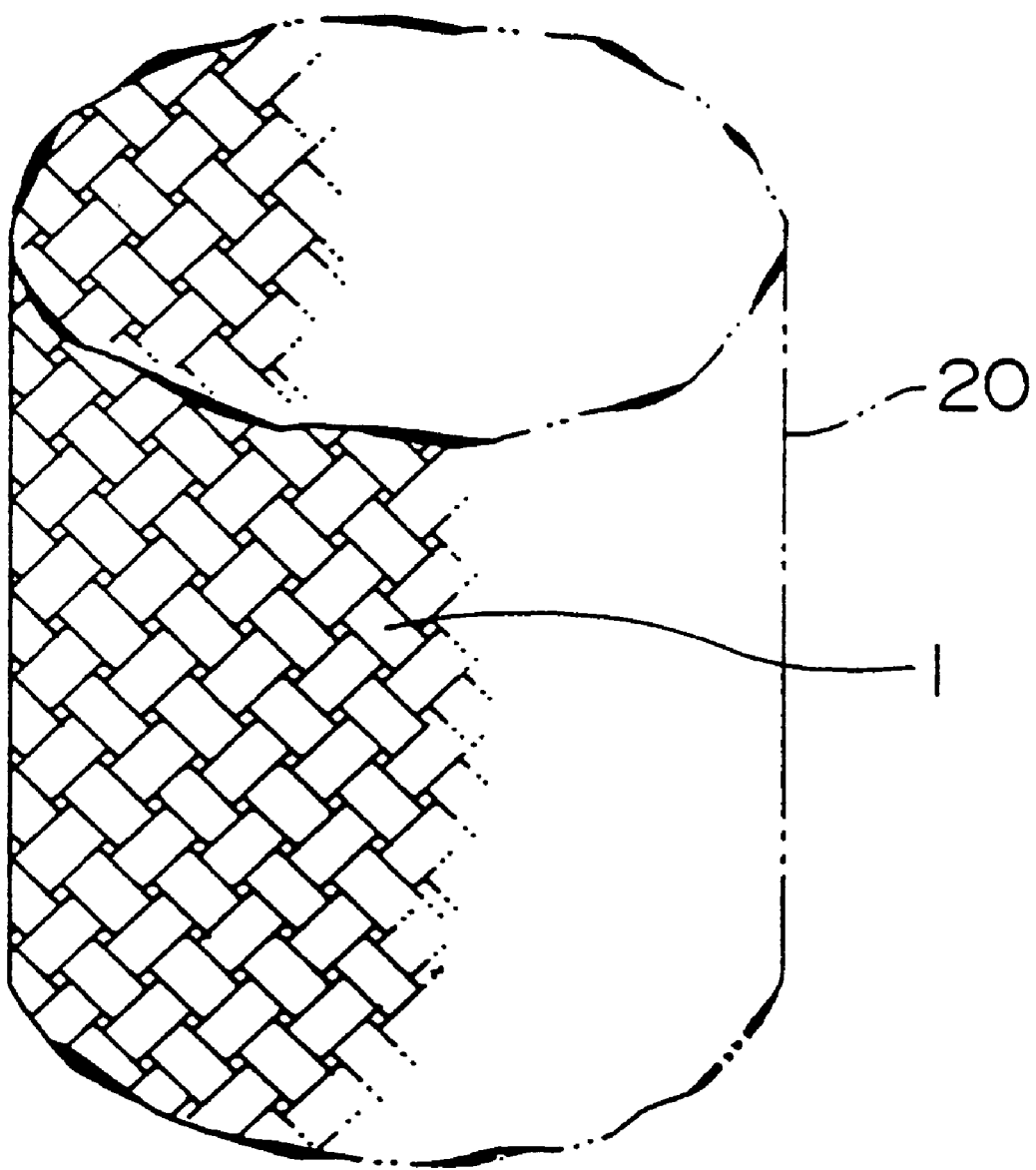
FIG. 3 is a front view showing an example of a sleeve to be used in production of an FRTP tubular molded object of the first embodiment.

FIG. 3 shows an example of a sleeve to be used for the first embodiment. The sleeve 20 is cylindrical, which is obtained by braiding the ribbon-shaped material for FRTP molded objects 1 as shown in FIG. 1.

Since the ribbon-shaped material for FRTP molded objects 1 is flat and thin, and thus is comparatively wide and occupies a large area, the texture of the sleeve 20 does not become coarse even if a tow with a large tex number is used and if the count of the tow is reduced; thus, the sleeve 20 can be made thin and with a close texture. Accordingly, since the weight per unit length of the sleeve 20 is small, such sleeves can be layered in more layers than conventional sleeves. Therefore, the reinforcing fibers can be arranged so as to provide a desirable strength with the FRTP tubular molded object obtained from the sleeves, and freedom of design is enhanced.

FIG. 4 is a diagram for explaining an example of production of an FRTP tubular molded object of the first embodiment. This example of production exemplifies the case where the FRTP tubular molded object to be obtained is a racket frame.

Figure 4A:
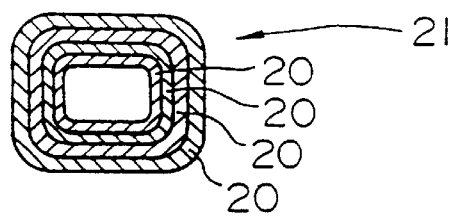
FIG. 4A is a cross-sectional view of a hollow laminate.

First, as shown in FIG. 4A, several (four in the figure) sleeves 20 are coaxially layered to form a hollow laminate 21.

Figure 4B:
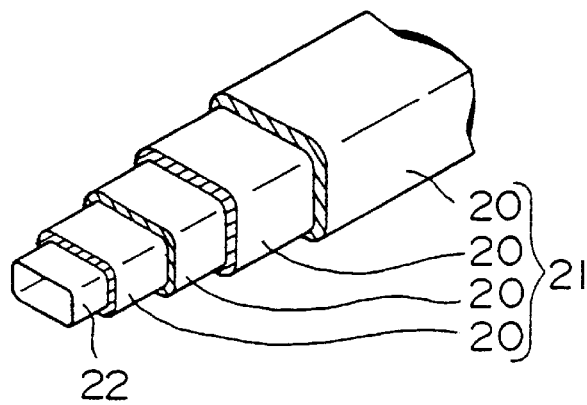
FIG. 4B is a schematic view of the hollow laminate covering the periphery of a tube made of a silicone rubber.
Figure 4C:
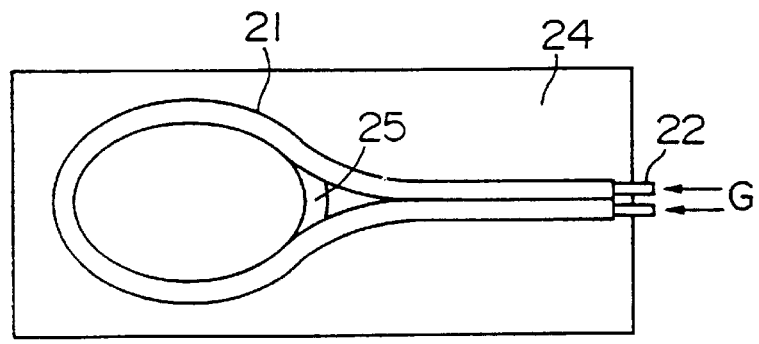
FIG. 4C is a schematic view of the hollow laminate placed in a mold.

Next, as shown in FIG. 4B, the periphery of a tube 22 made of silicone rubber is covered by the hollow laminate 21.

Figure 4D:
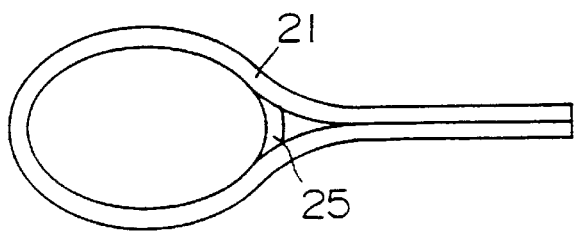
FIG. 4D is a schematic view of an FRTP tubular molded object.

Subsequently, as shown in FIG. 4D, the hollow laminate 21, together with the tube 22, is placed in a mold 24 for forming a racket frame. At this time, a prepreg to be a supporting member is also placed in the mold 24.

Then, the mold 24 is heated to a temperature higher than the melting point of thermoplastic resin constituting the thermoplastic resin film 3, so as to melt the thermoplastic resin and to impregnate the reinforcing fiber tow 2 with the melted thermoplastic resin. During the heating, an air pressure G is applied to the inside of the tube 22 so as to press the hollow laminate against the mold 24.

After this, the mold 24 is cooled while maintaining the air pressure. By reducing the pressure in the tube 22 and releasing the product from the mold, a molded object is obtained.

Finally, by drawing the tube 22 out of the molded object, a desired FRTP tubular molded object as shown in FIG. 4D is obtained.

Accordingly, since in the FRTP tubular molded object according to the first embodiment, which is obtained by using the sleeve 20 in which the ribbon-shaped material for FRTP molded objects 1 is braided, the ribbon-shaped reinforcing fiber tow 2 in the ribbon-shaped material for FRTP molded objects 1 which constitutes the sleeve 20 is thin and flat, a difference in level in an intersection of ribbon-shaped reinforcing fiber tows is small; accordingly, as empty spaces in intersections are reduced, voids hardly remain in the product, and thus the FRTP tubular molded object has a superior strength. Furthermore, the FRTP tubular molded object is inexpensive, since it can be obtained from an inexpensive ribbon-shaped material for FRTP molded objects.

Figure 5:
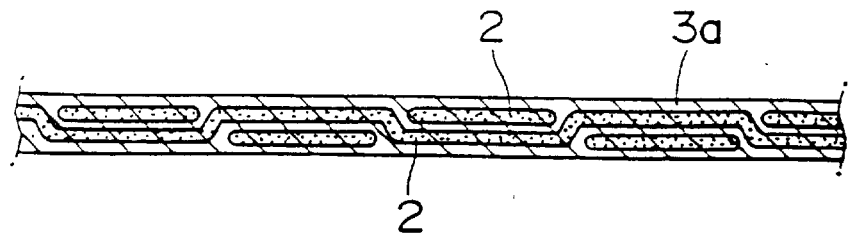
FIG. 5 is a diagram for explaining advantages of an FRTP tubular molded object of the first embodiment.

FIG. 5 is a diagram for explaining advantages of an FRTP tubular molded object of the first embodiment, showing a cross-sectional view of an object obtained by heating the sleeve shown in FIG. 3 so as to melt the thermoplastic resin 3a constituting the thermoplastic resin film 3, and to impregnate the ribbon-shaped reinforcing fiber tow 2 with the thermoplastic resin 3a. It can be seen from FIG. 5 that a difference in level of ribbon-shaped reinforcing fiber tows 2 in an intersection of the tows is small.

With regard to the above FRTP tubular molded object according to the first embodiment, a case is explained where a ribbon-shaped material for FRTP molded objects 1 in which a ribbon-shaped reinforcing fiber tow 2 is used is employed; however, another ribbon-shaped material for FRTP molded objects is also employable which comprises a laminate in which a ribbon-shaped yarn is placed between thermoplastic resin films for supplying matrix resin, which are wider than the ribbon-shaped yarn, the thermoplastic resin films being fused at both side portions of the laminate along the longitudinal direction thereof. The ribbon-shaped yarn to be used in such a case is thin and flat, which can be obtained by opening a roving comprising a matrix fiber, which is made of a thermoplastic resin, and a reinforcing fiber.

In addition, the aforementioned ribbon-shaped reinforcing fiber tow 2 may contain a matrix fiber made of a thermoplastic resin.

Moreover, the laminate 4 of the ribbon-shaped material for FRTP molded objects 1 may be an alternating laminate of ribbon-shaped reinforcing fiber tows 2 or ribbon-shaped yarns, as described in the above, and thermoplastic resin films for supplying matrix resin.

Furthermore, although the hot roll is used in the production apparatus according to the above production example of a ribbon-shaped material for FRTP molded objects 1, a belt or a press is also employable in the production apparatus.

The FRTP tubular molded object is produced according to the first embodiment by a method in which an inner pressure is applied to a hollow material, using the sleeve 20 formed by braiding the ribbon-shaped material for FRTP molded objects 1; however, the FRTP tubular molded object may be produced by various molding methods such as autoclave molding methods and filament winding methods, in which a cloth prepared by weaving the ribbon-shaped material for FRTP molded objects 1 or a prepreg for filament winding method prepared from the ribbon-shaped material for FRTP molded objects 1 is used. In such a case, since the ribbon-shaped material for FRTP molded objects 1 is smooth as explained in the above, it can be easily wound around a core material.

In the following, a second embodiment of an FRTP tubular molded object according to the present invention will be explained.

Figure 6:
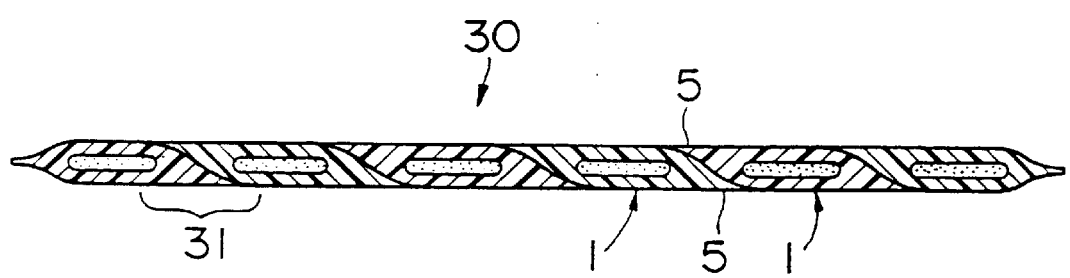
FIG. 6 is a cross sectional view showing an example of a wide material for FRTP molded objects, which is used for producing an FRTP tubular molded object of a second embodiment of the present invention.

The FRTP tubular molded object of the second embodiment differs from that of the first embodiment in that it is obtained by using a wide material for FRTP molded objects 30 as shown in FIG. 6.

The wide material for FRTP molded objects 30 is obtained by arranging a plurality (six in the figure) of ribbon-shaped materials for FRTP molded objects 1 as shown in FIG. 1 whereby adjacent ribbon-shaped materials for FRTP molded objects 1,1 overlap each other in a manner such that the side portion 5 of one of the adjacent ribbon-shaped materials for FRTP molded objects 1 is placed on the side portion 5 of the other along the longitudinal direction; and fusing together each overlapping portion 31 of the ribbon-shaped materials for FRTP molded objects 1; whereby the reinforcing fiber tows 2 are arranged in parallel.

The thickness of the wide material for FRTP molded objects 30 is preferably not larger than 1.0 mm, and more preferably not larger than 0.5 mm.

Figure 7:
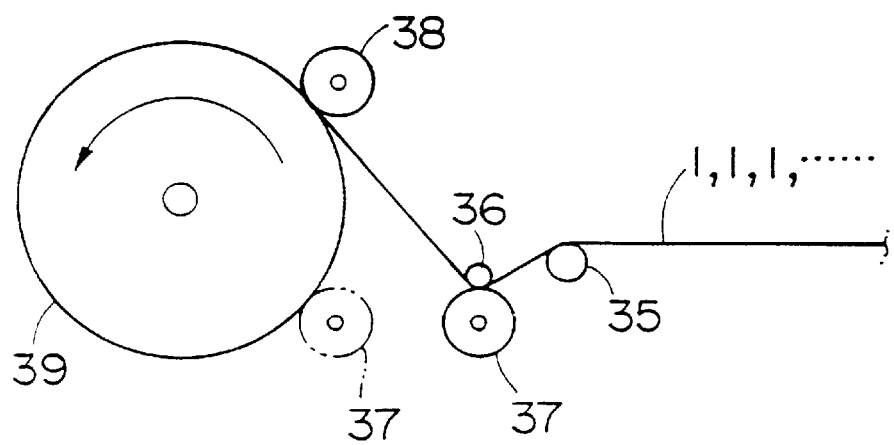
FIG. 7 is a schematic structural view for describing a production apparatus to be preferably used for producing the wide material for FRTP molded objects in FIG. 6.
Figure 8:
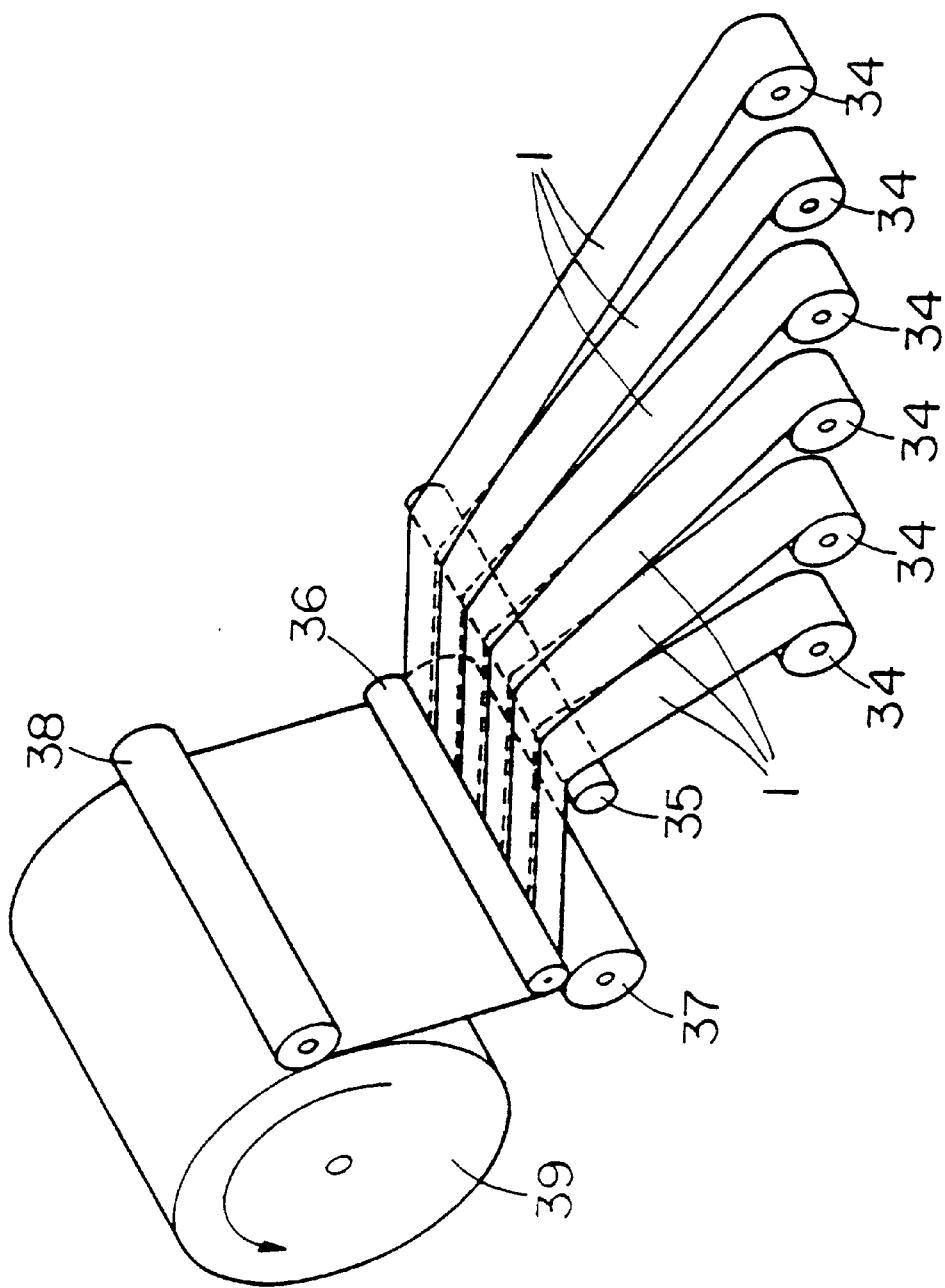
FIG. 8 is a perspective view showing a production apparatus to be preferably used for producing the wide material for FRTP molded objects in FIG. 6.
Figure 9:
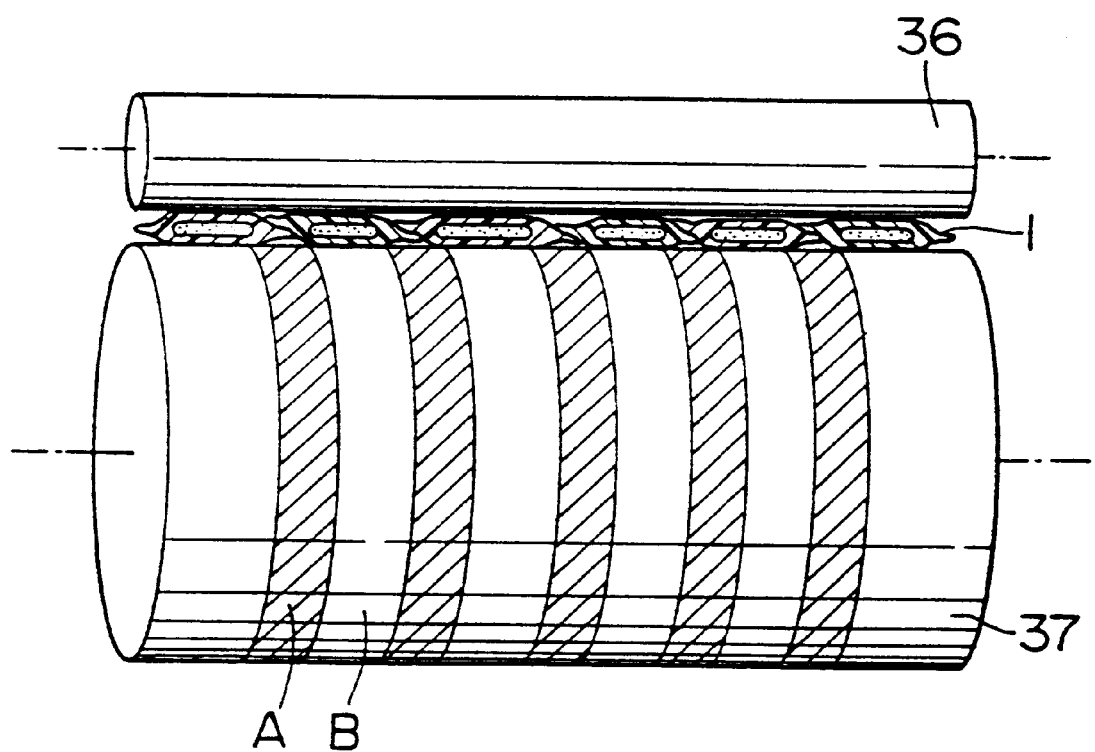
FIG. 9 is a partially enlarged view of the production apparatus shown in FIG. 8.

FIGS. 7 to 9 are diagrams with the purpose of describing a production apparatus to be preferably used for producing the wide material for FRTP molded objects 30 shown in FIG. 6.

In the figures, reference numeral 34 indicates a primary feeding roller, reference numeral 3S indicates a primary guide roller, reference numeral 36 indicates a silicone rubber roll, reference numeral 37 indicates a primary hot roll, reference numeral 38 indicates a press roll, and reference numeral 39 indicates a drum.

Using the apparatus shown in FIG. 8, the wide material for FRTP molded objects 30 shown in FIG. 6 is produced by the following steps.

Ribbon-shaped materials for FRTP molded objects 1 are fed from a plurality of primary feeding rollers 34 to a primary guide roller 35 whereby the ribbon-shaped materials overlap each other in a manner such that a side portion S of a ribbon-shaped material for FRTP molded objects 1 is placed on that of an adjacent ribbon-shaped material along the longitudinal direction. Subsequently, the (six, according to the figure) ribbon-shaped materials for FRTP molded objects 1 are fed to the space between a silicone rubber roll 36 and a primary hot roll 37, and heated. Then, as shown in FIG. 9, since the temperature of sections A on the primary hot roll 37, which have contact with the overlapping portions 31 of the ribbon-shaped materials for FRTP molded objects 1, is set higher than that of sections B, which have contact with portions other than the overlapping portions 31, the overlapping portions 31 of the ribbon-shaped materials for FRTP molded objects 1 are heated to a higher temperature than the portions other than the overlapping portions 31.

Subsequently, a plurality of the ribbon-shaped materials for FRTP molded objects 1 are fed from the space between the silicone rubber roll 36 and the primary hot roll 37 to the space between a press roll 38 and a drum 39 in a condition that any pair of adjacent ribbon-shaped materials for FRTP molded objects 1,1 overlap each other in a manner such that the side portion 5 of one of the adjacent ribbon-shaped materials is placed on the side portion 5 of the other. Then, the ribbon-shaped materials for FRTP molded objects 1 are pressed by the press roll 38 while being reeled on the drum 39. Thus, a wide material for FRTP molded objects 30 as shown in FIG. 6 is obtained in which the ribbon-shaped materials for FRTP molded objects 1 are linked in a manner such that in each overlapping portion 31 of the ribbon-shaped materials for FRTP molded objects 1, the thermoplastic resin films 3,3 of adjacent ribbon-shaped materials for FRTP molded objects 1,1 are fused.

According to the above constitution, the wide material for FRTP molded objects 30 has the same functions and advantages as those possessed by the above-described ribbon shaped material for FRTP molded objects 1. In addition, since this material 30 is wide, in some uses the wide material for FRTP molded objects 30, as it is, can be used as a prepreg for molding, without being made into a sleeve or a cloth.

An FRTP tubular molded object of the second embodiment obtained by using the wide material for FRTP molded objects 30 has the same functions and advantages as those possessed by the above-described FRTP tubular molded object of the first embodiment. In addition, in the case where the wide material for FRTP molded objects 30 is used as it is as a prepreg, there will be no intersections of reinforcing fibers; accordingly, no voids originated from spaces created in such intersections of reinforcing fibers remain in the product, which yields a superior strength.

Even though the primary hot roll 37 was the only heating device in the production example of the above wide material for FRTP molded objects 30, another hot roll may be additionally provided in place of the primary guide roller 35. Furthermore, instead of placing the primary hot roll 37 opposite to the silicone rubber roll 36, the primary hot roll 37 may be placed opposite to the drum 39 as shown in broken lines in FIG. 7. Moreover, instead of providing the primary thermal roll 37, a plurality of blowers to send hot air may be provided in front of the press roll 38 and the drum 39 so as to heat the overlapping portions 31 of the ribbon-shaped materials for FRTP molded objects 1, which are fed to the space between the press roll 38 and the drum 39, to a temperature higher than that of the portions other than the overlapping portions 31.

Figure 10:
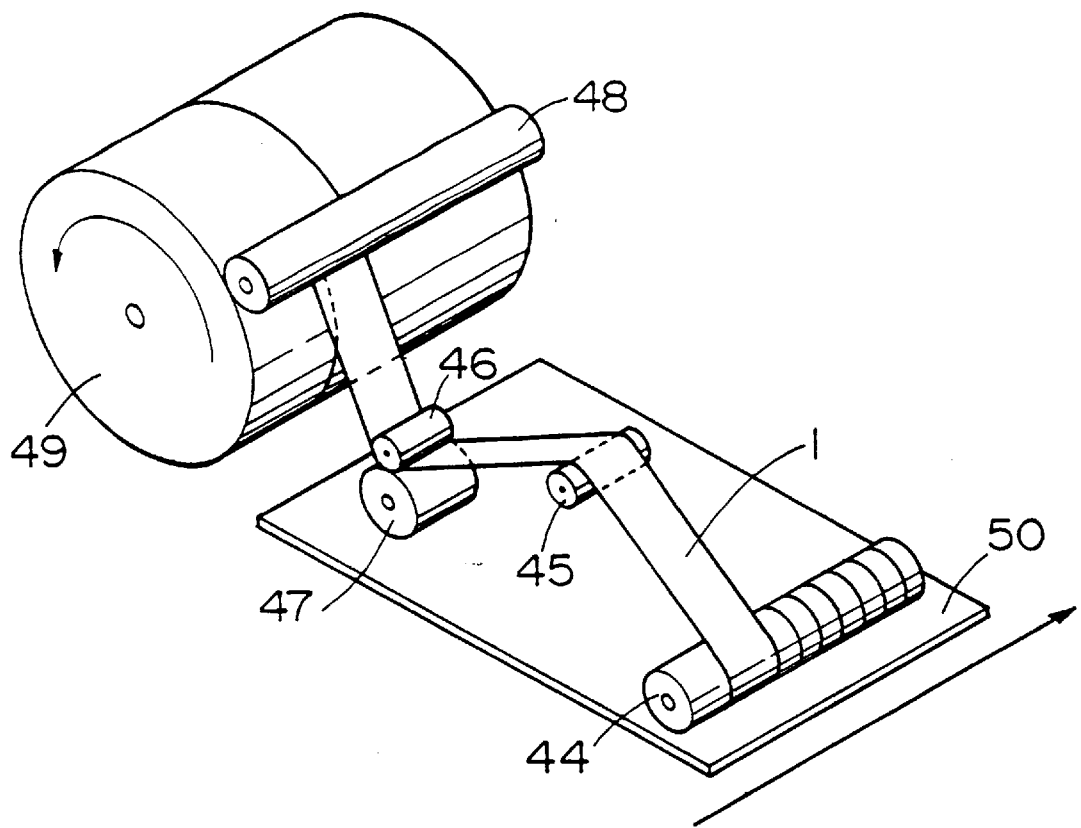
FIG. 10 is a perspective view showing another example of a production apparatus to be preferably used for producing the wide material for FRTP molded objects shown in FIG. 6.

FIG. 10 shows another example of a production apparatus to be preferably used in production of the wide material for FRTP molded objects 30 shown in FIG. 6.

In FIG. 10, reference numeral 44 indicates a primary feeding roller, reference numeral 45 indicates a primary guide roller, reference numeral 46 indicates a silicone rubber roller, reference numeral 47 indicates a primary hot roll, reference numeral 48 indicates a press roll, reference numeral 49 indicates a drum, and reference numeral 50 indicates a movable plate. The primary feeding roller 44, the primary guide roller 45, the silicone rubber roll 46, and the primary hot roll 47 are placed on the movable plate 50, so that they can traverse along the longitudinal direction of the drum 49.

Using the apparatus shown in FIG. 10, the wide material for FRTP molded objects 30 shown in FIG. 6 can be produced in batch process by the following steps.

A ribbon-shaped material for FRTP molded objects 1 is fed from the primary feeding roller 44 via the primary guide roller 45 to the space between the silicone rubber roll 46 and the primary hot roll 47, and is heated, while the movable plate 50 is moved along the longitudinal direction of the drum 49. Then, the ribbon-shaped material for FRTP molded objects 1 is fed to the space between the press roll 48 and the drum 49 where the ribbon-shaped material 1 is pressed by the press roll 48 while being reeled on the drum 49. Throughout these steps, the movable plate 50 is moved so that the side portion 5 of a part of the ribbon-shaped material for FRTP molded objects 1 to be reeled on the drum 49 is placed on the side portion 5 of another part of the ribbon-shaped material 1 which has been reeled on the drum 49. Accordingly, a wide material for FRTP molded objects 30 as shown in FIG. 6 can be obtained in which the thermoplastic resin films 3,3 in the overlapping portion 31 of the ribbon-shaped material for FRTP molded objects 1 are fused.

In the following, a third embodiment of an FRTP tubular molded object according to the present invention will be explained.

Figure 11:
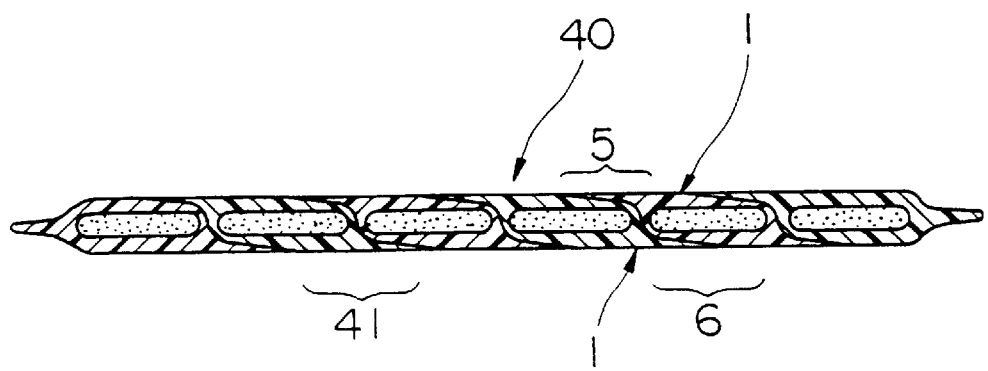
FIG. 11 is a cross sectional view showing an example of a wide material for FRTP molded objects, which is used for producing an FRTP tubular molded object of a third embodiment of the present invention.

The FRTP tubular molded object of the third embodiment is obtained by using a wide material for FRTP molded objects 40 as shown in FIG. 11.

The wide material for FRTP molded objects 40 is obtained by arranging a plurality (six in the figure) of ribbon-shaped materials for FRTP molded objects 1 as shown in FIG. 1 whereby adjacent ribbon-shaped materials for FRTP molded objects 1,1 overlap each other in a manner such that the side portion 5 of one of the adjacent ribbon-shaped materials for FRTP molded objects 1 is placed on the middle portion 6 of the other along the longitudinal direction; and fusing together each overlapping portion 41 of the ribbon-shaped materials for FRTP molded objects 1; whereby the reinforcing fiber tows 2 are arranged in parallel.

The thickness of the wide material for FRTP molded objects 40 is preferably not larger than 1.0 mm, and more preferably not larger than 0.5 mm.

The wide material for FRTP molded objects 40 can be produced by using the same production apparatuses as those used in the second embodiment.

In the case where the production apparatus shown in FIGS. 7 to 9 is used for the third embodiment, process for producing the wide material for FRTP molded objects 40 is the same as that of the second embodiment, except that a plurality of the ribbon-shaped materials for FRTP molded objects 1 are fed to the space between a press roll 38 and a drum 39 in a condition that any pair of adjacent ribbon-shaped materials for FRTP molded objects 1,1 overlap each other in a manner such that the side portion 5 along the longitudinal direction of one of the adjacent ribbon-shaped materials is placed on the middle portion 6 of the other.

In the case where the production apparatus shown in FIG. 10 is used for the third embodiment, process for producing the wide material for FRTP molded objects 40 is the same as that of the second embodiment, except that the movable plate 50 is moved so that the side portion 5 of a part of the ribbon-shaped material for FRTP molded objects 1 to be reeled on the drum 49 is placed on the middle portion 6 of another part of the ribbon-shaped material 1 which has been reeled on the drum 49.

The thus-obtained wide material for FRTP molded objects 40 has the same functions and advantages as those of the wide material for FRTP molded objects 30 described in the second embodiment. In addition, the wide material for FRTP molded objects 40 of the third embodiment has another advantage in that the reinforcing fibers can be more densely and more uniformly contained in an FRTP molded object obtained therefrom.

Although the invention has been described in detail herein with reference to its preferred embodiments and certain described alternatives, it is to be understood that this description is by way of example only, and it is not to be construed in a limiting sense. It is further understood that numerous changes in the details of the embodiments of the invention, and additional embodiments of the invention, will be apparent to, and may be made by, persons of ordinary skill in the art having reference to this description. It is contemplated that all such changes and additional embodiments are within the spirit and true scope of the invention as claimed.

What is claimed is:

1. A material for FRTP molded objects comprising: a laminate in which a collection of reinforcing fibers is placed between thermoplastic resin films for supplying matrix resin; the laminate having opposed surfaces and side portions, in each of which side portions the thermoplastic resin films are fused such that the reinforcing fibers are surrounded by the thermoplastic resin films, the laminate having a middle portion between the side portions, which middle portion contains the collection of reinforcing fibers and parts of the thermoplastic resin films holding the collection of reinforcing fibers therebetween, the volumetric fiber content (Vf) of the laminate being from about 30 to 60 percent, and the laminate having a center portion between the opposed surfaces, in which center portion the reinforcing fibers are not impregnated or very slightly impregnated with resin such that the fibers in said center portion may slide with respect to each other so that said laminate is flexible.

2. A ribbon-shaped material for FRTP molded objects comprising a laminate in which a collection of reinforcing fibers in a ribbon shape selected from the group consisting of a ribbon-shaped reinforcing fiber tow and a ribbon-shaped yarn is placed between thermoplastic resin films for supplying matrix resin which are wider than the collection of reinforcing fibers; the laminate having opposed surfaces and side portions, in each of which sides of the thermoplastic resin films along a longitudinal direction of the laminate are fused such that the reinforcing fibers are surrounded by the thermoplastic resin films, and a middle portion between the side portions, which contains the collection of reinforcing fibers and parts of the thermoplastic resin films holding the collection of reinforcing fibers therebetween, the volumetric fiber content (Vf) of the laminate being from about 30 to 60 percent, and the laminate having a center portion between the opposed surfaces, in which center portion the reinforcing fibers are not impregnated or very slightly impregnated with resin such that the fibers in said center portion may slide with respect to each other so that said laminate is flexible.

3. A material for FRTP molded objects according to claim 1, wherein the laminate is an alternating laminate of collections of reinforcing fibers and thermoplastic resin films for supplying matrix resin.

4. A ribbon-shaped material for FRTP molded objects according to claim 2, wherein the laminate is an alternating laminate of collections of reinforcing fibers and thermoplastic resin films for supplying matrix resin.

5. A wide material for FRTP molded objects comprising a plurality of materials for FRTP molded objects of claim 1, in which the wide material for FRTP molded objects has an overlapping portion in which a pair of adjacent materials for FRTP molded objects overlap each other in a manner such that the side portion of one of the adjacent materials is placed on the side portion of the other, and are fused, whereby the collections of reinforcing fibers are arranged in parallel.

6. A wide material for FRTP molded objects comprising a plurality of ribbon-shaped materials for FRTP molded objects of claim 2, in which the wide material for FRTP molded objects has an overlapping portion in which a pair of adjacent ribbon-shaped materials for FRTP molded objects overlap each other in a manner such that the side portion of one of the adjacent ribbon-shaped materials is placed on the side portion of the other, and are fused, whereby the collections of reinforcing fibers are arranged in parallel.

7. A wide material for FRTP molded objects comprising a plurality of materials for FRTP molded objects of claim 1, in which the wide material for FRTP molded objects has an overlapping portion in which a pair of adjacent materials for FRTP molded objects overlap each other in a manner such that the side portion of one of the adjacent materials is placed on the middle portion of the other, and are fused, whereby the collections of reinforcing fibers are arranged in parallel.

8. A wide material for FRTP molded objects comprising a plurality of ribbon-shaped materials for FRTP molded objects of claim 2, in which the wide material for FRTP molded objects has an overlapping portion in which a pair of adjacent ribbon-shaped materials for FRTP molded objects overlap each other in a manner such that the side portion of one of the adjacent ribbon-shaped materials is placed on the middle portion of the other, and are fused, whereby the collections of reinforcing fibers are arranged in parallel.

9. An FRTP tubular molded object obtained by using a material for FRTP molded objects of claim 1.

10. An FRTP tubular molded object obtained by using a material for FRTP molded objects of claim 2.

11. An FRTP tubular molded object obtained by using a material for FRTP molded objects of claim 5.

12. An FRTP tubular molded object obtained by using a material for FRTP molded objects of claim 6.

13. An FRTP tubular molded object obtained by using a material for FRTP molded objects of claim 7.

14. An FRTP tubular molded object obtained by using a material for FRTP molded objects of claim 8.

15. A material for FRTP molded objects according to claim 1, wherein the thickness of the side portion are thinner than the thickness of the middle portion.

16. A ribbon shaped material for molded objects according to claim 2, wherein the thickness of the side portions are thinner than the thickness of the middle portion.

* * * * *